United States Patent [19]

Kawai et al.

[11] 4,425,262

[45] Jan. 10, 1984

[54] ELECTROCONDUCTIVE RESIN COMPOSITION

[75] Inventors: Yoichi Kawai, Yokohama; Yoshiro Nakamura, Morioka; Yoshihisa Gotoh, Yokohama; Masami Maki, Kawasaki; Sachio Yokote, Yokohama; Katsumi Sekiguchi, Tokyo, all of Japan

[73] Assignee: Mitsui Toatsu Chemicals, Inc., Tokyo, Japan

[21] Appl. No.: 347,996

[22] Filed: Feb. 11, 1982

[30] Foreign Application Priority Data

Feb. 20, 1981 [JP] Japan ................................ 56-23147

[51] Int. Cl.$^3$ ............................................... H01B 1/06
[52] U.S. Cl. .................................. 252/511; 524/100; 524/101
[58] Field of Search ................ 524/80, 101, 495, 496, 524/100; 252/511, 502, 510; 525/348

[56] References Cited

U.S. PATENT DOCUMENTS

| 3,528,943 | 9/1970 | Goldberg et al. | 524/80 |
| 3,622,547 | 11/1971 | Ermidis | 525/348 |
| 3,637,582 | 1/1972 | Giles | 524/101 |
| 3,671,663 | 6/1972 | Seifert et al. | 252/511 |
| 3,862,053 | 1/1975 | Susi | 524/101 |
| 3,959,219 | 5/1976 | Aoyama et al. | 524/101 |
| 4,174,341 | 11/1979 | Matoba et al. | 525/348 |
| 4,240,949 | 12/1980 | Ecker | 524/80 |
| 4,278,510 | 7/1981 | Chien et al. | 252/511 |

FOREIGN PATENT DOCUMENTS 54-60349 4/1979 Japan.
55-58236 4/1980 Japan.

*Primary Examiner*—Josephine Barr
*Attorney, Agent, or Firm*—Fisher, Christen & Sabol

[57] ABSTRACT

An electroconductive polyolefin composition comprising (a) 100 parts by weight of a polyolefin resin, (b) 10 to 60 parts by weight of carbon black, (c) 0.1 to 6 parts by weight of sulfur and (d) 0.1 to 5 parts by weight of trithiolcyanuric acid, and optionally containing 5 to 60 parts by weight of atactic polypropylene.

7 Claims, No Drawings

ELECTROCONDUCTIVE RESIN COMPOSITION

TECHNICAL FIELD

This invention relates to an electroconductive resin composition which can be directly electroplated to provide a metal coating of excellent adhesion. More specifically, this invention relates to an electroconductive resin composition comprising (a) a polyolefin resin, (b) carbon black, (c) sulfur and (d) trithiolcyanuric acid which has excellent direct electroplatability and permits formation of a plated layer having uniform and good adhesion.

PRIOR ART

Polyolefin resins have previously been used also as base materials of plated articles, but since they are non-electric conductors, they cannot be directly electroplated. Hence electroplating of the polyolefin resins has been carried out after subjecting them to complex pre-treatment steps such as degreasing by dipping in a warm alkaline solution, pre-etching by dipping in an organic solvent solution, etching by dipping in mixed chromic acid, sensitizing by dipping in an HCl-acidified solution of stannous chloride, activation by dipping in an HCl-acidified solution of palladium chloride, and electroless nickel plating by dipping in an alkaline or acidic nickel plating bath. Various attempts have therefore been made to omit these complex pre-treating steps and perform electroplating directly on shaped articles of polyolefin resins.

One attempt is directed to a method which involves adding carbon black to a thermoplastic resin such as a polyolefin resin to render it electrically conductive and then performing electroplating directly on the resulting electroconductive resin. Although this method gives a plated metal coating, it is of no practical use because there is scarcely any adhesion between the metal coating and the resin base.

As another attempt, Japanese Laid-Open Patent Publication No. 60349/1979 suggests a composition comprising a polyolefin resin, 25 to 41% of electrically conductive carbon black, 0.15 to 15% of sulfur, 0 to 7% of zinc oxide and 0.2 to 1.5% of mercaptobenzothiazole or mercaptobenzothiazyl disulfide. This composition, however, has the defect that the molding characteristics of the resin composition are poor and flow marks are seen to form on the surface of large-sized molded articles resulting in much impairment of the appearance of a plated layer formed thereon, and, on the other hand, that much bleeding of compounding ingredients, particularly mercaptobenzothiazole, etc., occurs on the surface of a molded article, and although an adhesion between the plated layer and the resin base can be obtained, it is not uniform and good.

Methods have also been suggested which involve addition of a vulcanization accelerator instead of the mercaptobenzothiazole or mercaptobenzothiazyl disulfide in the aforesaid composition, but they have similar defects.

SUMMARY OF THE INVENTION

The present inventors have made various investigations in order to remedy the aforesaid defects. These investigations have led to the discovery that an electroconductive resin composition comprising (a) 100 parts by weight of a polyolefin resin, (b) 10 to 60 parts by weight of carbon black, (c) 0.1 to 6 parts by weight of sulfur and (d) 0.1 to 5 parts by weight of trithiolcyanuric acid has good direct electroplatability; that no bleeding of the compounding ingredients on the surface of a molded article of the composition is observed; and that a plated layer on the resin molded article has uniform and good adhesion to any part of the surface of the molded article.

DETAILED DESCRIPTION OF THE INVENTION

Examples of the polyolefin resin used in this invention include polypropylene-type resins such as a propylene homopolymer, an ethylene/propylene copolymer, an ethylene/propylene rubber, and an ethylene/propylene non-conjugated diene copolymer rubber, polyolefin resins selected from polyethylene and polyisobutylene, and blends of two or more of these polyolefin resins. Among these, the use of the ethylene/propylene copolymer and the joint use of the propylene homopolymer or ethylene/propylene copolymer and the ethylene/propylene rubber are preferred.

Generally, when carbon black is added to a polyolefin resin, the resulting composition has decreased flowability. Accordingly, in the present invention, it is preferred to use polyolefin resins having a melt flow index of at least 20 (determined by ASTM D-1238; to be abbreviated MI hereinafter).

Carbon blacks generally sold on the market can be used in the present invention, and there is no particular restriction on the type of carbon black used. Examples are acetylene black obtained by the acetylene method, furnace black obtained by the furnace method, thermal black by the natural gas thermal method, lump black, and conductive carbon black. The conductive carbon black is especially preferred in view of its electric conductivity and flowability. The amount of the carbon black added is 10 to 60 parts by weight, preferably 10 to 40 parts by weight, per 100 parts by weight of the polyolefin resin. When the amount of the carbon black exceeds 60 parts by weight, the resulting composition gives too hard molded articles and the flowability of the composition during molding is inferior. When the amount of carbon black is less than 10 parts by weight, the composition has too high an electric resistance and its electroplatability is reduced.

Sulfur used in this invention may be in any form if it is elemental. Powdery sulfur is convenient to use. The amount of sulfur added is 0.1 to 6 parts by weight, preferably 0.3 to 5 parts by weight, on the same basis. When the amount is less than 0.1 part by weight, the adhesion of a plated layer decreases. When the amount exceeds 6 parts by weight, the adhesion of the plated layer similarly decreases.

Trithiolcyanuric acid is a compound having a melting point of 280° C., and is essential in the composition of this invention in order to obtain a uniform and good adhesion of plated coatings. The amount of trithiolcyanuric acid is 0.1 to 5 parts by weight, preferably 0.3 to 2 parts by weight, more preferably 0.3 to 1.0 part by weight, on the same basis. If the amount is less than 0.1 part by weight, it is impossible to obtain an effect of increasing the adhesion of plated coatings, particularly an effect of reducing variations in the adhesion strength of a plated coating according to the sites of a molded article. If it exceeds 6 parts by weight, an effect of increasing and uniforming the adhesion strength cannot be expected.

Mixing of the individual ingredients in the production of the electroconductive resin composition of this invention is performed by melt-extrusion using a single-screw extruder, a twin-screw extruder, etc. which are generally used in the art. As required, the composition is pelletized. Preferably, the extruding temperature is set as low as possible in order to avoid heat decomposition of the resin. In producing this composition, there may be further added a phenolic antioxidant such as tetrakis[methylene-3-(3',5'-di-t-butyl-4'-hydroxyphenyl)propionate]methane and 2,6-di-t-butyl-p-cresol as a stabilizer to oxygen and heat, a metal deterioration inhibitor such as melamine, a filler, a slip agent, a blowing agent and a fire retardant such as antimony dioxide and halogenated hydrocarbons which are generally used for polyolefin resins in the art. Preferably, 5 to 60 parts by weight of atactic polypropylene may also be added to the polyolefin resin composition in order to increase its flowability during molding and to shorten the time during which a molded article after molding is left to stand before it is electroplated.

The electroconductive resin composition of this invention has an electric resistance of usually not more than $10^3$ ohms although it may vary depending upon the types of the polyolefin resin, carbon black, etc. used. In view of operability in plating, the electrical resistance of the resin composition is preferably not more than 300 ohms.

The resin composition of this invention so obtained can be molded into a desired molded article by various molding methods such as injection molding, extrusion molding and compression molding.

Plating of a molded article formed from the electroconductive resin composition of this invention is carried out, for example, by washing it with a weak alkaline detergent and water, first electroplating the washed article from a Watts bath at a low voltage, for example for 3 minutes at 1 volt, and for 3 minutes at 1.5 volts, and then electroplating it under ordinary electroplating conditions. For example, it is possible to perform nickel strike plating to a thickness of 3 μm, copper plating to a thickness of 10 μm, then nickel plating to a thickness of 10 μm, and chrome plating to a thickness of 0.1 μm in layers. The plated coatings so formed on the molded article of the composition of this invention have uniform and very good adhesion, and shows sufficient durability against a heat cycle test.

The electric resistance of the resin is determined by measuring the resistance of a 1 cm-interval of the surface of a molded article by means of a tester. The adhesion strength between the plated coating and the resin is determined by providing cuts with a width of 1 cm in the plated layer, peeling the plated layer from the resin layer in a direction at an angle of 180°, and measuring the peel strength at the time of peeling by means of a tensile tester at a stretching speed of 30 mm/min. The heat cycle test is a method of evaluating the adhesion of a plated coating which comprises maintaining a plated test sample for 2 hours in a constant temperature chamber kept at 85° C., then allowing it to stand in the chamber until the temperature of the chamber is lowered to room temperature, then maintaining it for 2 hours at $-30°$ C., allowing it to stand until the temperature rises to room temperature, and repeating this heating-cooling cycle 10 times, and thereafter observing the plated surface of the sample for the occurrence of cracks, blisters, etc.

The following examples illustrate the present invention more specifically.

EXAMPLE 1

To 100 parts by weight of ethylene/propylene copolymer (BJ4H, a trademark for a polyolefin resin made by Mitsui Toatsu Chemicals, Inc.; MI 20 g/10 min.) were added 22 parts by weight of Ketjen Black (carbon black made by Lion-Akzo Co., Ltd.), 1 part by weight of sulfur, 0.5 part by weight of trithiolcyanuric acid and 20 parts by weight of atactic polypropylene. They were mixed by a Henschel mixer and then kneaded and pelletized by an extruder. The pellets were molded by an injection molding machine into a flat plate (80 mm × 160 mm × thickness 2 mm) having a gate at one of its shorter sides. The flat plate had an electric resistance of 38 ohms.

The flat plate was electroplated for 5 minutes at 1 $A/dm^2$ in a Watts bath at pH 4.2 containing 280 g/liter of $Ni(SO_4)_2.6H_2O$, 50 g/liter of $NiCl_2.6H_2O$ and 45 g/liter of boric acid to form a nickel plated coating. It was further electroplated in a copper plating bath containing 220 g/liter of $Cu(SO_4)_2.5H_2O$ and 55 g/liter of $H_2SO_4$ at 2.8 $A/dm^2$ for 90 minutes to obtain a copper plated layer having a thickness of 50 μm. Four cuts each having a width of 1 cm and a length of 6 cm were provided parallel to each other at intervals of 3 cm on the resulting plated sample starting at its gate end portion. The adhesion of the plated layer to the flat plate was measured at the four positions, and found to be 2.0, 2.1, 2.1 and 2.1 kg/cm from the gate end portion. Thus, the adhesion of the plated layer was uniform. When the resulting plated sample was subjected to a heat cycle test consisting of ten cooling-heating cycles, no change was noted on the plated surface of the sample.

EXAMPLE 2

Pellets were obtained and molded into a flat plate in the same way as in Example 1 except that the amount of trithiolcyanuric acid was changed to 1.0 part by weight. The resulting flat plate had an electric resistance of 32 ohms. The flat plate was subjected to nickel plating and copper plating under the same conditions as in Example 1, and the adhesion of the plated layer to the resin was measured in the same way as in Example 1, and found to be 2.5, 2.5, 2.6 and 2.6 kg/cm respectively, showing uniform adhesion strength. When the resulting plated sample was subjected to the same heat cycle test as in Example 1, no change was noted on the plated surface of the sample.

EXAMPLE 3

The procedure of Example 1 was followed except that 60 parts by weight of a propylene homopolymer (J4H, a trade name for a product of Mitsui Toatsu Chemicals, Inc.; MI 20 g/10 min.) and 40 parts by weight of an ethylene/propylene (Toughmer P0280, a trade name for a product of Mitsui Petrochemical Industries, Ltd.) were used instead of the polyolefin resin used in Example 1. The resulting flat plate had an electric resistance of 36 ohms. The adhesion strength of the plated layer was 2.0, 2.0, 2.0 and 2.1 kg/cm respectively from the gate portion. No change was noted on the plated surface of the sample by the cooling-heating cycle test.

EXAMPLE 4

The procedure of Example 1 was followed except that 80 parts by weight of an ethylene/propylene copolymer (BJ4H, a tradename for a product of Mitsui Toatsu Chemicals, Inc.; MI 20 g/10 min.) and 20 parts by weight of an ethylene/propylene (Toughmer P0280, a trademark for a product of Mitsui Petrochemical Industries, Ltd.) were used instead of the polyolefin resin in Example 1.

The resulting flat plate had an electric resistance of 35 ohms. The adhesion strength of the plated layer was 2.1, 2.1, 2.2 and 2.1 kg/cm from the gate portion. In the cooling-heating cycle test, no change was noted on the plated surface of the sample.

COMPARATIVE EXAMPLE 1

Pellets were formed and molded into a flat plate in the same way as in Example 1 except that trithiolcyanuric acid was not used. The resulting flat plate had an electric resistance of 44 ohms. The flat plate was subjected to nickel plating and copper plating under the same conditions as in Example 1. The adhesion strength of the plated layer to the resin was measured in the same way as in Example 1 and found to be 0.1, 0, 0.1 and 0.1 kg/cm respectively, showing almost no adhesion.

COMPARATIVE EXAMPLE 2

Pellets were formed and molded into a flat plate in the same way as in Example 1 except that 1.0 parts by weight of mercaptobenzothiazole was used instead of trithiolcyanuric acid. The resulting flat plate had an electric resistance of 40 ohms. The flat plate was subjected to nickel plating and copper plating under the same conditions as in Example 1. The adhesion strength of the plated layer to the resin was measured in the same way as in Example 1, and found to be 0.5, 0.8, 1.8, and 1.5 kg/cm, showing non-uniform adhesion. When the plated sample was subjected to the same heat cycle test as in Example 1, many blisters were seen to occur on the plated surface.

It is seen from the above results that the plated molded article obtained by the method of this comparative example had an adhesion strength which varied greatly from part to part of the molded article, and was of no practical use.

What is claimed is:

1. An electroconductive propylene polymer composition comprising: (a) 100 parts by weight of a propylene polymer selected from the group consisting of an ethylene/propylene copolymer, a combination of a propylene homopolymer with a ethylene/propylene rubber, and a combination of an ethylene/propylene copolymer with an ethylene/propylene rubber; (b) 10 to 60 parts by weight of carbon black; (c) 0.1 to 6 parts by weight of sulfur; and (d) 0.1 to 5 parts by weight of trithiolcyanuric acid.

2. The composition as in claim 1 wherein the amount of trithiolcyanuric acid is 0.3 to 2 parts by weight.

3. The composition as in claim 1, which is prepared by mixing the propylene polymer, carbon black, sulfur and trithiolcyanuric acid by melt-extrusion.

4. The composition as in claim 1, which comprises 100 parts by weight of the propylene polymer, 10 to 60 parts by weight of carbon black, 0.1 to 6 parts by weight of sulfur, 0.1 to 5 parts by weight of trithiolcyanuric acid, and 5 to 60 parts by weight of an atactic propylene polymer.

5. The composition as in claim 1, wherein the propylene polymer as a melt flow index of at least 20.

6. The composition as in claim 1, wherein the amount of sulfur is 0.3 to 5 parts by weight.

7. The composition as in claim 1, wherein the amount of carbon black is 10 to 40 parts by weight.

* * * * *